United States Patent [19]
Baker

[11] 3,988,357
[45] Oct. 26, 1976

[54] CERTAIN OXIME CARBONATES
[75] Inventor: Don Robert Baker, Orinda, Calif.
[73] Assignee: Stauffer Chemical Company, Westport, Conn.
[22] Filed: Jan. 20, 1975
[21] Appl. No.: 542,159

[52] U.S. Cl. ............................ 260/463; 424/301
[51] Int. Cl.² .................................. C07C 69/96
[58] Field of Search ............................ 260/463

[56] References Cited
UNITED STATES PATENTS

| | | | |
|---|---|---|---|
| 3,624,091 | 11/1971 | Daum | 260/463 X |
| 3,694,482 | 9/1972 | Engelhart | 260/463 X |
| 3,832,375 | 8/1974 | Itoh | 260/463 |
| 3,875,232 | 4/1975 | Magee | 260/463 X |

OTHER PUBLICATIONS
Zinner; Chem. Ber., 91, (1958), pp. 302–307.

*Primary Examiner*—Joseph Paul Brust
*Attorney, Agent, or Firm*—Edwin H. Baker

[57] ABSTRACT

Compounds having the formula

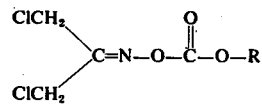

in which R is alkyl having from 1 to 6 carbon atoms. The compounds are useful in inhibiting the growth of bacteria and fungi.

4 Claims, No Drawings

CERTAIN OXIME CARBONATES

Description of the Invention

This invention relates to novel chemical compounds and to their use in controlling fungi and bacteria. More particularly, the chemical compounds are certain keto oxime carbonates.

The compounds of the present invention are those having the formula

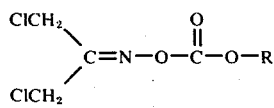

in which R is alkyl having from 1 to 6 carbon atoms.

The compounds of the present invention can be prepared by reacting a compound of the formula

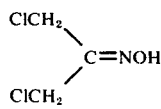

with a compound of the formula

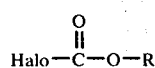

in which halo is chlorine or bromine and R is as defined.

Preferably, the reaction is carried out in the presence of a base such as pyridine and in a solvent for the reactants. Generally, the reaction is exothermic so no heating is required. Cooling is sometimes required to control the reaction rate. The compounds of this invention can be recovered from the mixture and purified by standard procedures.

Compounds of the formula

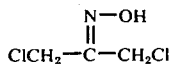

can be prepared by reacting

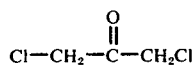

with excess hydroxylamine hydrochloride or hydroxylamine hydrobromide in ethanol and water. The reaction can be run with heating under reflux for several hours. The desired product is recovered and purified by conventional techniques.

EXAMPLE 1

1,3-dichloroacetoneoxime 63.5 grams (0.50 mole) 1,3-dichloropropanone, 69.5 grams (1.00 mole) hydroxylamine hydrochloride, 250 ml. ethanol and 25 ml. of water were combined and heated under reflux for four hours. The cooled mixture was poured into 500 ml. of water. The aqueous solution was extracted with three 100 ml. portions of chloroform. The chloroform phases were combined and dried with anhydrous $MgSO_4$. The chloroform was evaporated to give 66.3 g. (93.6% theory) of 1,3-dichloroacetoneoxime,

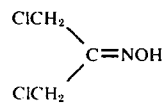

$N_D^{30}=1.5044$.

EXAMPLE 2

1,3-dichloroacetoneoxime O-methyl carbonate 14.1 grams (0.10 mole) 1,3-dichloroacetoneoxime, 10.1 grams (0.13 mole) methylchloroformate were combined in 200 ml. of benzene. The mixture was stirred with cooling at 13° to 14° C. for 20 minutes with 18.1 ml. (0.13 mole) of triethyl amine. The mixture was allowed to warm to room temperature. The mixture was washed with two 100 ml. portions of water. The benzene phase was dried with anhydrous $MgSO_4$ and evaporated to give 9.7 g. of 1,3-dichloroacetoneoxime O-methyl carbonate.

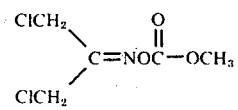

$N_D^{30}=1.4722$.

The following is a table of certain selected compounds that are preparable according to the procedure described hereto. Compound numbers have been assigned to each compound and are used throughout the remainder of the application.

| Compound No. | R |
| --- | --- |
| 1a | methyl |
| 2 | ethyl |
| 3 | n-butyl |
| 4 | hexyl | a-Prepared in Example 2.

In Vitro Vial Test

The following test illustrates utility of the compounds in controlling fungi and bacteria. This test measures the bactericidal and fungicidal properties of a compound when in contact with a growing bacterium or fungus. The test is conducted by partially filling two 1-ounce vials with malt broth and one 1-ounce vial with nutrient broth. Next the test compound is added to the vials at a certain concentration, expressed in parts per million, and mixed with the broth. A water suspension of spores of the desired fungi or cells of the desired bacteria (one organism per vial) is added. The vials are then sealed and incubated for one week; at this time the vials are examined and the results recorded. Table II shows the results of various compounds tested by the In Vitro Vial Test, partial control of the test organism is indicated by parenthesis. In such a case, complete control was observed at the next higher concentration.

TABLE II

| Concentration (p.p.m.) Which Inhibited Growth | | | | |
|---|---|---|---|---|
| Compound number | Aspergillus niger | Penicillium italicum | Escherichia coli | Staphylococcus aureus |
| 1 | (.25) | (.25) | >50 | 25 |
| 2 | .125 | (.125) | >50 | 5 |
| 3 | .125 | (1) | >50 | 25 |

Sulfate Reducing Bacteria In Vitro Test

This test measures the bactericidal properties of a compound when in contact with a sulfate reducing bacteria, specifically *Desulfovibrio desulfuricans*. The test is conducted by dissolving the test compound in acetone to give an 0.5% solution. This toxicant is added to vials containing sterile Sulfate API broth with tryptone under anaerobic conditions at such levels to give final toxicant concentrations of 1, 5, 10 and 50 ug/ml. of solution. An inoculant solution of 0.5 ml. of the growing organism, *Desulfovibrio desulfuricans*, is added to the vials followed by sufficient sterile distilled water to give a total of 10 ml. of solution in the vials. The vials are incubated at room temperature for 3 to 5 days until untreated controls show growth of the organism as indicated by the black color development in the vials.

The following is a summary of the minimum inhibitory concentration necessary to control the organism.

| Compound Number | Minimum Inhibitory Conc. µg/ml |
|---|---|
| 2 | 5 |

As can be seen by the test results, the compounds find particular utility as bactericides and fungicides. The compounds can be applied in a variety of ways at various concentrations. They can be combined with suitable carriers and applied as dusts, sprays, or drenches. The amount applied will depend on the nature of the utility. The rate of application can also vary with the microbiological use intended.

The problems associated with sulfate reducing bacteria and method of application for the control thereof are described in U.S. Pat. No. 3,300,375 which is incorporated herein by reference thereto.

It is claimed:
1. A compound of the formula

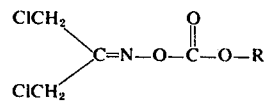

in which R is alkyl having 1 to 6 carbon atoms.
2. The compound of claim 1 in which R is methyl.
3. The compound of claim 1 in which R is ethyl.
4. The compound of claim 1 in which R is n-butyl.

* * * * *